US011492965B1

United States Patent
Krejci et al.

(10) Patent No.: US 11,492,965 B1
(45) Date of Patent: Nov. 8, 2022

(54) TURBOCHARGER TURBINE ROTARY BYPASS VALVE PROVIDING WASTE GATE REGULATION AND FULL TURBINE BYPASS FUNCTIONS

(71) Applicant: Garrett Transportation I Inc., Torrance, CA (US)

(72) Inventors: Jaroslav Krejci, Brno (CZ); Jan Klement, Brno (CZ); Miroslav Zatko, Brno (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/446,619

(22) Filed: Aug. 31, 2021

(51) Int. Cl.
*F02B 37/18* (2006.01)
*F02B 37/22* (2006.01)
*F02C 6/12* (2006.01)
*F01D 17/00* (2006.01)

(52) U.S. Cl.
CPC ............... *F02C 6/12* (2013.01); *F01D 17/00* (2013.01); *F02B 37/186* (2013.01); *F02B 37/22* (2013.01)

(58) Field of Classification Search
CPC .......... F02C 6/12; F01D 17/00; F02B 37/186; F02B 37/22
See application file for complete search history.

(56) References Cited

U.S. PATENT DOCUMENTS

| 6,442,936 | B1 | 9/2002 | Houtz |
| 7,165,403 | B2 | 1/2007 | Sun et al. |
| 8,567,192 | B2 | 10/2013 | Chi et al. |
| 9,062,615 | B2 | 6/2015 | Polkus et al. |
| 9,869,237 | B2 | 1/2018 | Houst et al. |
| 10,677,150 | B2 | 6/2020 | Babak |
| 2011/0000208 | A1* | 1/2011 | Robinson ............... F02B 37/16 60/602 |
| 2016/0208680 | A1* | 7/2016 | McConville ............ F02B 37/22 |
| 2019/0242298 | A1 | 8/2019 | Zatko et al. |

FOREIGN PATENT DOCUMENTS

WO 2008125555 A1 10/2008

* cited by examiner

*Primary Examiner* — Audrey B. Walter
*Assistant Examiner* — Edward Bushard
(74) *Attorney, Agent, or Firm* — John C. James (57) ABSTRACT

A turbocharger includes a three-way rotary turbine bypass valve (TBV) operable to selectively supply exhaust gases to a turbine feed passage leading to a turbine wheel, and/or to a bypass passage that bypasses the turbine wheel. The TBV is structured and arranged to close the bypass outlet of the valve when the turbine outlet is fully open, to partially open the bypass passage while the turbine outlet remains fully open, to fully open the bypass passage when the turbine outlet is partially closed, and to fully open the bypass passage when the turbine passage is fully closed. The TBV turns the exhaust gas flows through acute angles between inlet and outlets, mitigating pressure losses through the valve. Leakage to bypass is minimized by a labyrinth seal formed when the valve member closes the bypass outlet.

7 Claims, 6 Drawing Sheets

TURBOCHARGER TURBINE ROTARY BYPASS VALVE PROVIDING WASTE GATE REGULATION AND FULL TURBINE BYPASS FUNCTIONS

BACKGROUND OF THE INVENTION

This application relates generally to turbochargers for internal combustion engines, and relates more particularly to turbochargers having a turbine bypass valve controllable to cause exhaust gases from the engine to bypass the turbine under certain operating conditions.

Some vehicles include a turbocharger system having one or more turbochargers. Typically, turbochargers include a turbine wheel and a compressor wheel mounted on a common shaft and carried within isolated turbine and compressor housings, respectively. The turbine wheel is rotatably driven by exhaust gas fed from the engine into an annular chamber of the turbine housing, from which the exhaust gas is directed to an annular nozzle radially inwardly to the turbine wheel. The turbine wheel in turn rotates the compressor wheel for compressing air that is fed to the combustion chambers of the engine. Accordingly, the turbocharger can provide a performance boost and increased efficiency to the engine.

Exhaust gas flow through the turbocharger system may change depending on the operating conditions of the engine. For example, in lower-load conditions, exhaust gas mass flow may be relatively low. In contrast, in higher-load conditions, exhaust gas mass flow may be relatively high. Also, exhaust gas flow may vary from engine startup to a fully warmed-up running condition. Other operating conditions may affect exhaust gas flow as well.

Accordingly, it is desirable to provide an improved turbocharger system that regulates the flow of exhaust gas in a variety of operating conditions. In a conventional turbocharger, the turbine housing defines a bypass conduit located generally to one side of the main bore through the housing, and the bypass conduit is connected to the exhaust gas inlet or the exhaust gas chamber of the housing via a bypass valve, also called a waste gate valve. The waste gate valve typically is a swing or poppet style valve comprising a circular valve member that is urged against a flat valve seat surrounding the bypass passage opening. The valve usually is arranged such that the exhaust gas pressure acts on the valve member in a direction tending to open the valve. One drawback associated with such an arrangement is that it is difficult to completely seal the valve in the closed position, since gas pressure tends to open the valve. Leakage past the closed waste gate valve is a cause of performance degradation of the turbine and, hence, the turbocharger and its associated engine. The typical solution to the leakage issue is to preload the waste gate valve member against the valve seat, but often this does not fully eliminate leakage, and in any event it causes additional problems such as an increase in the required actuation force for opening the valve.

Furthermore, swing or poppet valves tend to be poor in terms of controllability, especially at the crack-open point, and it is common for the bypass flow rate to be highly nonlinear with valve position, which makes it very difficult to properly regulate the bypass flow rate. This leads to problems such as poor transient response of the turbocharger and engine system.

One object of the development described herein is to provide improved controllability to the exhaust gas flow to and around the turbine in a turbocharger.

Another issue impacting exhaust gas flow regulation is engine emissions. New emission standards require significant reduction of cold-start emissions. A catalytic converter typically requires a minimum "light-off" temperature of approximately 300° C. to start the catalytic process. The period of time after a cold start during which the catalyst is being heated to this temperature is called the catalyst light-off period. Emissions of government-regulated exhaust gas components such as NOx are much higher during catalyst light-off than during normal engine running. Accordingly, significant work has gone into various schemes for reducing the level of emissions produced during catalyst light-off.

Because cold-start emissions can by reduced by faster heating of the catalytic converter, one potential scheme for reducing cold-start emissions would be to fully bypass the turbine and feed the exhaust gases directly to the catalyst, thereby avoiding the significant drop in temperature of the exhaust gases when they must first pass through the turbine. However, a standard waste gate system does not close the turbocharger inlet, and therefore is unable to completely bypass the turbine. Therefore, a secondary valve that closes the turbine inlet would be necessary, but double-valve systems mean high cost and packaging constraints.

SUMMARY OF THE DISCLOSURE

The present disclosure describes a single-valve system that is able to fully bypass the turbine for fast catalyst light-off, and is also able to regulate the flow through the turbine after the catalytic converter has reached its operational state. The described system requires only one valve and one actuator. At a peak torque condition, the turbine inlet can be open with no restriction, while the turbine bypass passage is fully closed. At full engine load, the turbine inlet can remain fully open while the bypass passage begins to open. In other operating conditions, the turbine inlet can be partially closed while the bypass passage is fully opened, so as to lead to a base boost benefit. For cold start, the turbine inlet can be fully closed while the bypass passage is fully open for rapid catalyst light-off.

A turbocharger in accordance with one embodiment of the invention comprises a compressor and a turbine, the turbine comprising a turbine housing having a turbine wheel disposed therein. The turbine housing defines an annular chamber surrounding the turbine wheel for receiving exhaust gases from an internal combustion engine, and an axial bore through which exhaust gases are discharged after passing through the turbine wheel. The turbocharger includes a three-way valve housing comprising an inlet, a first outlet, and a second outlet, the inlet and the first and second outlets being connected to a valve chamber defined by the three-way valve housing. The valve chamber defines a cylindrical inner surface surrounding a valve chamber axis. The first outlet has a first circumferential width and the second outlet has a second circumferential width.

The turbine housing further defines a turbine feed passage connected between the first outlet of the three-way valve housing and the annular chamber, and a bypass passage connected between the second outlet and the axial bore downstream of the turbine wheel. A rotary valve member is disposed in the valve chamber and is rotatable about the valve chamber axis between successive first, second, third, and fourth rotational positions. The rotary valve member comprises a hollow member having an outer wall defining a cylindrical outer surface confronting the cylindrical inner surface of the valve chamber. The outer wall of the valve member defines a valve member outlet comprising an opening through the outer wall, and the valve member outlet has a third circumferential width that is large enough to span across the entire first circumferential width of the first outlet plus a portion of the second circumferential width of the second outlet.

The first and second outlets in the valve housing and the valve member outlet are configured and positioned such that in the first rotational position of the rotary valve member, the valve member outlet circumferentially overlaps all of the first outlet while the outer wall closes the second outlet. Thus, in the first rotational position, the turbine feed passage is fully opened while the bypass passage is closed. In the second rotational position, the valve member outlet circumferentially overlaps all of the first outlet and overlaps partially with the second outlet, such that the turbine feed passage remains fully open and the bypass passage begins to open. In the third rotational position, the valve member outlet circumferentially overlaps partially with the first outlet and overlaps all of the second outlet, such that the turbine feed passage is partially open and the bypass passage is fully open. In the fourth rotational position, the valve member outlet circumferentially overlaps all of the second outlet while the outer wall closes the first outlet, such that the turbine feed passage is closed and the bypass passage is fully open.

In one embodiment, the first outlet defines a first outlet flow direction that makes an obtuse angle with the valve chamber axis, and the second outlet defines a second outlet flow direction that makes an obtuse angle with the valve chamber axis and makes an acute angle with the first outlet flow direction.

The first outlet can be rectangular and the second outlet can be triangular.

In one embodiment, one end of the rotary valve member adjacent the inlet to the three-way valve housing is open, and an opposite end of the rotary valve member is closed by a sloping end wall that makes an obtuse angle with the valve chamber axis.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
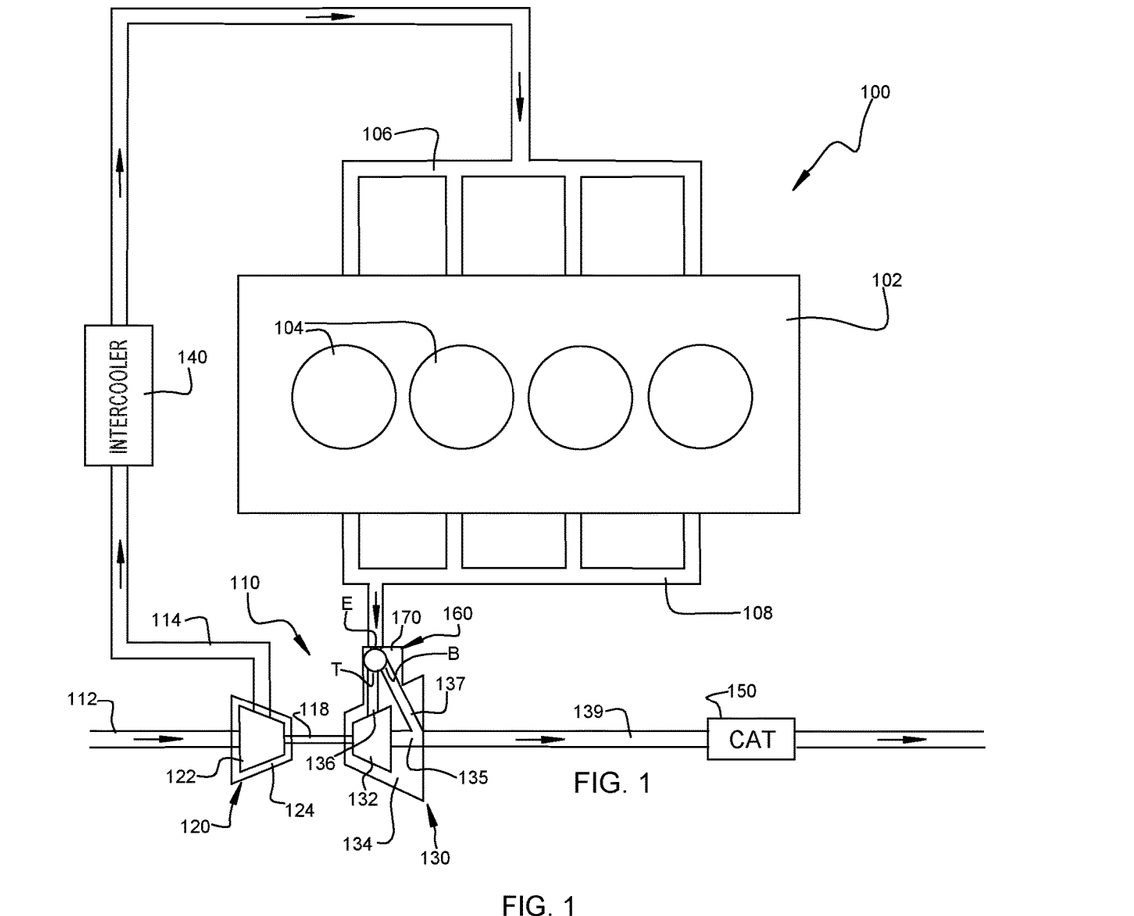
FIG. 1 is a diagrammatic view of a turbocharged internal combustion engine system representative of the type of engine system to which the present invention may be applied.

FIG. 1 illustrates a turbocharged internal combustion engine system 100 representative of a type of engine system to which the present invention may be applied. The system includes an internal combustion engine 102 having piston-cylinder assemblies 104 within which an air-fuel mixture is combusted. Air is introduced into the cylinders from an air intake manifold 106, along with fuel sprayed or injected into the cylinders. The air-fuel mixture combusts and exhaust gases are discharged from the cylinders into an exhaust manifold 108. The system further includes a turbocharger 110 coupled with the engine for boosting the pressure of the air delivered to the intake manifold 106. The turbocharger comprises a compressor 120 and a turbine 130. The compressor comprises a compressor wheel 122 housed within a compressor housing 124, the compressor wheel being affixed to one end of a rotatable shaft 118. The turbine comprises a turbine wheel 132 housed within a turbine housing 134, the turbine wheel being affixed to the other end of the shaft. Exhaust gases from the exhaust manifold are fed into the turbine 130, rotatably driving the turbine wheel 132, which in turn rotatably drives the compressor wheel 122. Air fed into the compressor wheel via an air inlet 112 is compressed and discharged from the compressor into an air discharge conduit 114. The air typically is then passed through an intercooler 140, which cools the air before it is fed into the air intake manifold 106.

The exhaust gases that have passed through the turbine wheel 132 are discharged from an axial bore 135 defined by the turbine housing, into an exhaust conduit 139. The exhaust conduit leads the exhaust gases through a catalytic treatment device 150, and the exhaust gases then flow to the vehicle's muffler and tail pipe system.

The system further includes a turbine bypass valve (TBV) 160 operable for selectively causing a fraction or all of the exhaust gases coming from the exhaust manifold to bypass the turbine wheel 132. The TBV defines an inlet E, a first outlet T, and a second outlet B, so-designated because the inlet receives exhaust gas from the engine, the first outlet feeds exhaust gas to a turbine feed passage 136 in the turbine housing 134, and the second outlet feeds exhaust gas to a bypass passage 137 in the turbine housing so that it does not pass through the turbine wheel 132 but instead proceeds directly into the axial bore 135 downstream of the turbine wheel. The TBV is operable to selectively close and open each of the outlets and establish a fluid connection between the inlet and whichever of the outlets is/are open, as further described below.

Figure 2:
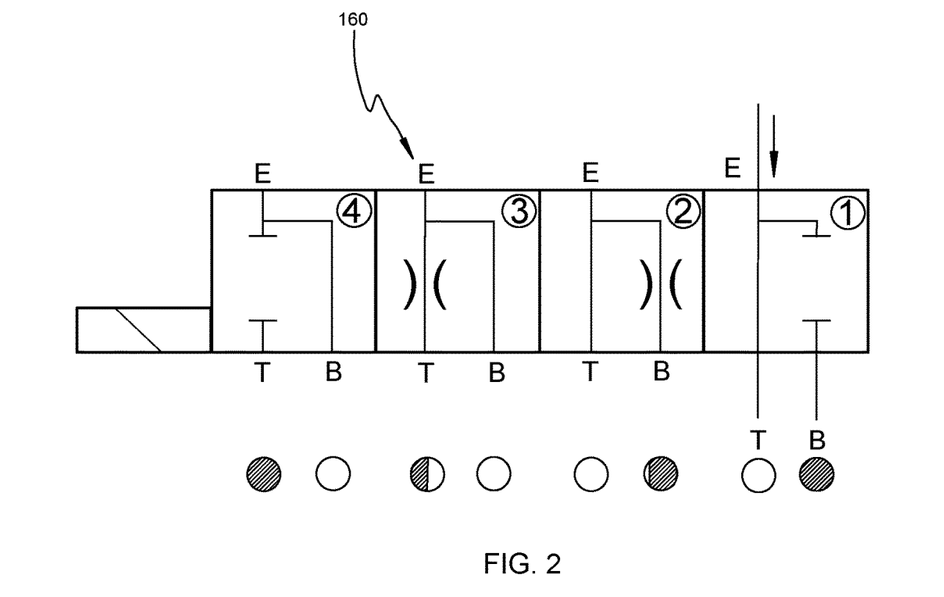
FIG. 2 is schematic valve diagram for a three-way turbine bypass valve (TBV) in accordance with embodiments of the invention.
Figure 3:
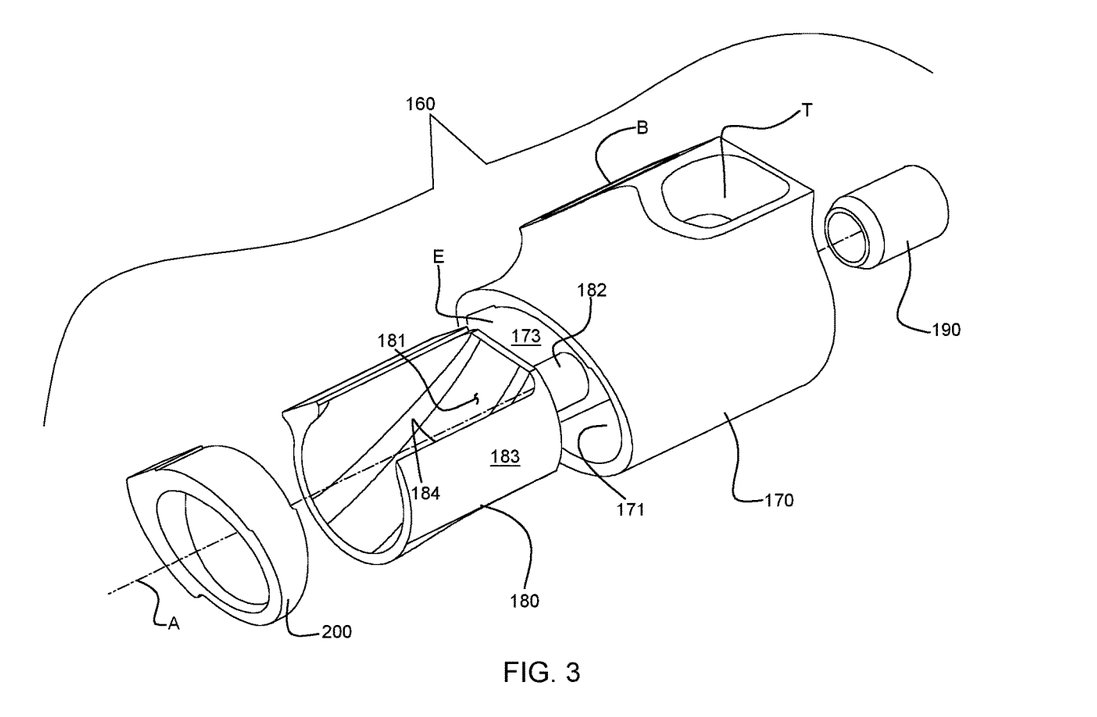
FIG. 3 is an exploded view of a three-way TBV in accordance with one embodiment of the invention.
Figure 4:
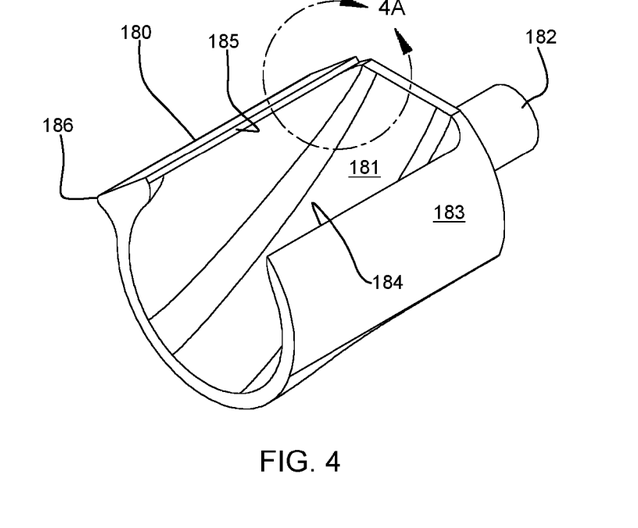
FIG. 4 is an isometric view of the valve member of the TBV in accordance with one embodiment of the invention.
Figure 4A:
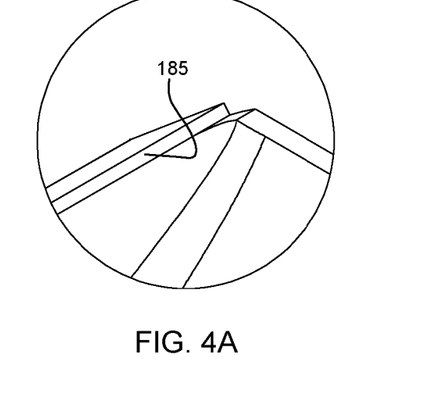
FIG. 4A is a detail view of a portion of FIG. 4.
Figure 4B:
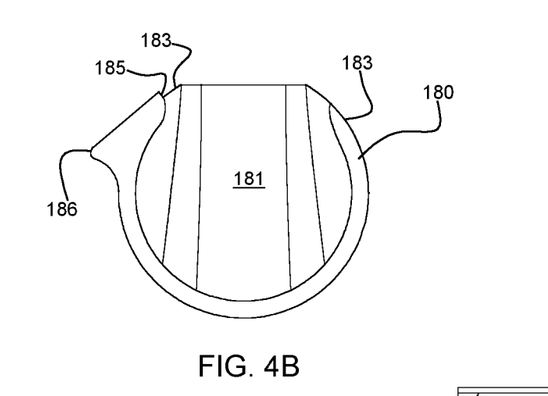
FIG. 4B is an axial end view of the valve member of FIG. 4.
Figure 4C:
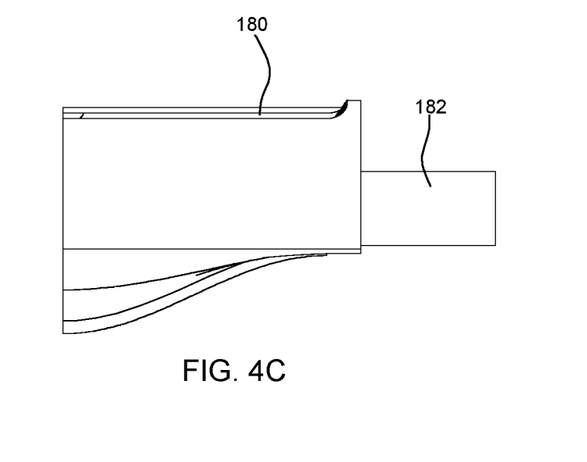
FIG. 4C is a side view of the valve member of FIG. 4.

FIG. 2 is a pneumatic valve diagram of the TBV 160 to explain its functioning. The diagram has four boxes corresponding to four different states or positions of the valve. In a first position on the right in FIG. 2, the valve opens the first outlet T and closes the second outlet B, and establishes a fluid connection between the inlet E and the first outlet T, as also illustrated in the circles below each of the outlets, where full or partial hatching denotes a fully or partially closed condition respectively, and lack of hatching denotes an open condition. Thus, in position "1", all of the exhaust gases from the engine are supplied to the turbine wheel.

In position "2" of the TBV, the first outlet T remains open and the second outlet B is partially opened. In this second position, a fraction of the exhaust gases from the engine bypass the turbine wheel.

In position "3" of the TBV, the first outlet T begins to close partially, and the second outlet B is now fully open. In this third position, some of the exhaust gases from the engine bypass the turbine wheel, and the remainder of the gases pass through the wheel.

In position "4" of the TBV, the first outlet T is closed and the second outlet B is fully open. Thus, all of the exhaust gases from the engine will bypass the turbine wheel. For fast heating of the catalytic treatment device after a cold start of the engine, the TBV is placed in this fourth position so that the exhaust gases reaching the catalyst will not have lost thermal energy by passage through the turbine.

An exemplary configuration of a TBV in accordance with an embodiment of the invention is now described with reference to FIGS. 3 through 11. The main components of the TBV 160 are illustrated in the exploded view of FIG. 3. The valve comprises a valve housing 170, a valve member 180, a bushing 190, and a cap 200. The valve housing 170 for the inventive three-way TBV can be formed separately from the turbine housing 134; alternatively, as illustrated in FIG. 1, the valve housing 170 can be an integrally formed portion of the turbine housing 134. The valve housing defines an internal valve chamber 171 into which the valve member 180 is received, and the cap 200 is fixedly installed in the open end of the valve housing after insertion of the valve member to captively retain the valve member. As noted, one end of the valve housing is open and thereby defines the inlet E, and the opposite end of the valve housing is closed by an end wall 172 (FIG. 7). The valve housing defines a first outlet T and a second outlet B.

The valve member is a generally cylindrical hollow member and is rotatable within the valve housing about a valve chamber axis A. One end of the valve member is open to its hollow interior, and the opposite end of the valve member is closed by a sloped end wall 181 on which is supported an axle 182 projecting axially from an outer surface of the valve member. The end wall 181 makes an obtuse angle with the valve chamber axis A. The bushing 190 defines a bore for receiving the axle. An actuator (not shown) engaged with the axle can rotate the valve member between its various positions. The bushing for the axle is fixedly mounted in a through-hole H defined by the end wall 172 (FIGS. 5 and 5A) of the valve housing 170. The valve member 180 comprises an outer wall defining a generally cylindrical outer surface 183 that is of slightly smaller diameter than a generally cylindrical inner surface 173 of the valve housing. An opening 184 is defined in the outer wall of the valve member, and thus forms the outlet for the valve member. As further described below, the opening 184 can fully or partially overlap each of the first and second outlets in the valve housing for selectively directing exhaust gases to either or both of the outlets depending on the desired state of the valve for a given engine operating condition. An important aspect of the inventive valve is that the valve member opening 184 has a circumferential width that is large enough to span across the entire first circumferential width of the first outlet plus a portion of the second circumferential width of the second outlet. The purpose of this aspect will become apparent when the functioning of the valve is discussed below in connection with FIGS. 8 through 11.

With reference now to FIGS. 4, 4A, 4B, and 4C, the structure of the valve member 180 is illustrated in further detail. Along one edge of the opening 184 in the outer wall, a portion of the valve member extends out to a radius greater than that of the cylindrical outer surface 183, and defines an axially extending edge 185 that faces in a circumferential direction of the valve member. The edge 185 comprises a seal surface for engaging a corresponding stop surface on the inner surface of the valve housing (as further described below in connection with FIGS. 8A and 9A), which establishes a first position of the valve member in a rotational sense about the valve chamber axis.

Figures 5, 5A:
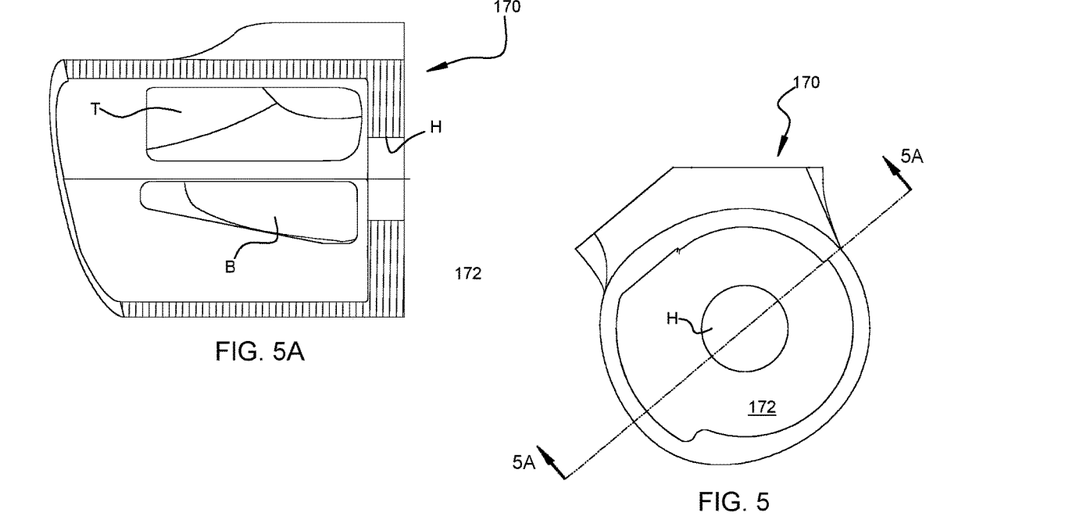
FIG. 5 is an axial end view of the three-way valve housing for the TBV in accordance with one embodiment of the invention.
FIG. 5A is a cross-sectional view along line 5A-5A of FIG. 5.
Figures 6, 6A:
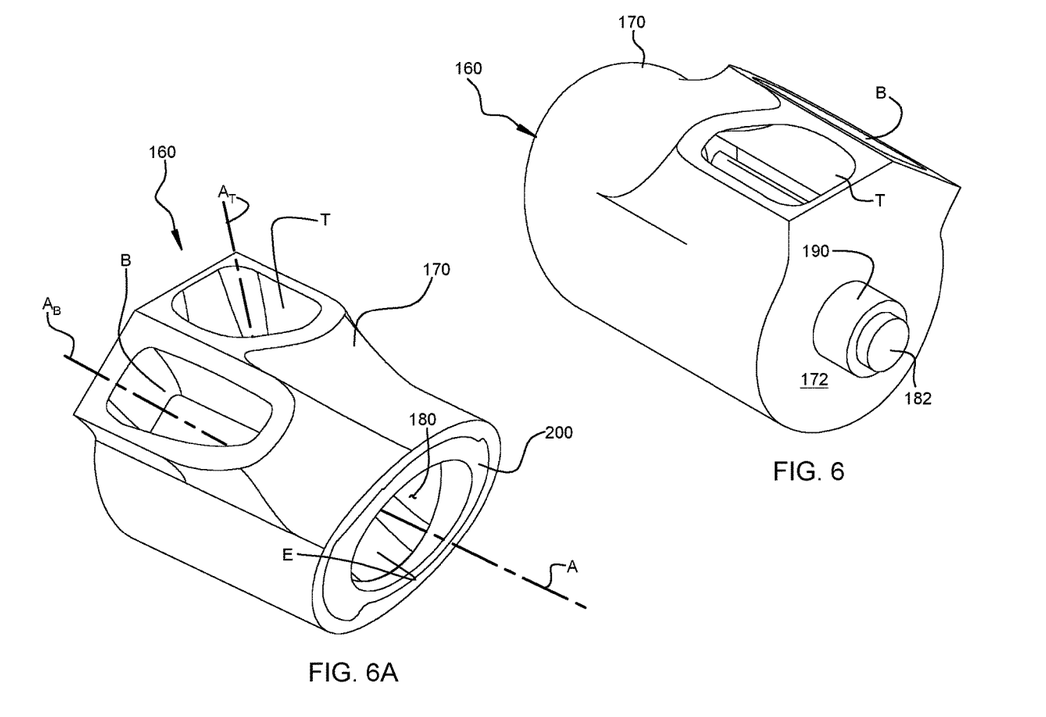
FIG. 6 is an isometric view of the assembled three-way TBV in accordance with one embodiment of the invention, seen looking toward one end of the TBV.
FIG. 6A is an isometric view of the TBV, seen looking toward an opposite end of the TBV.
Figures 7, 7A:
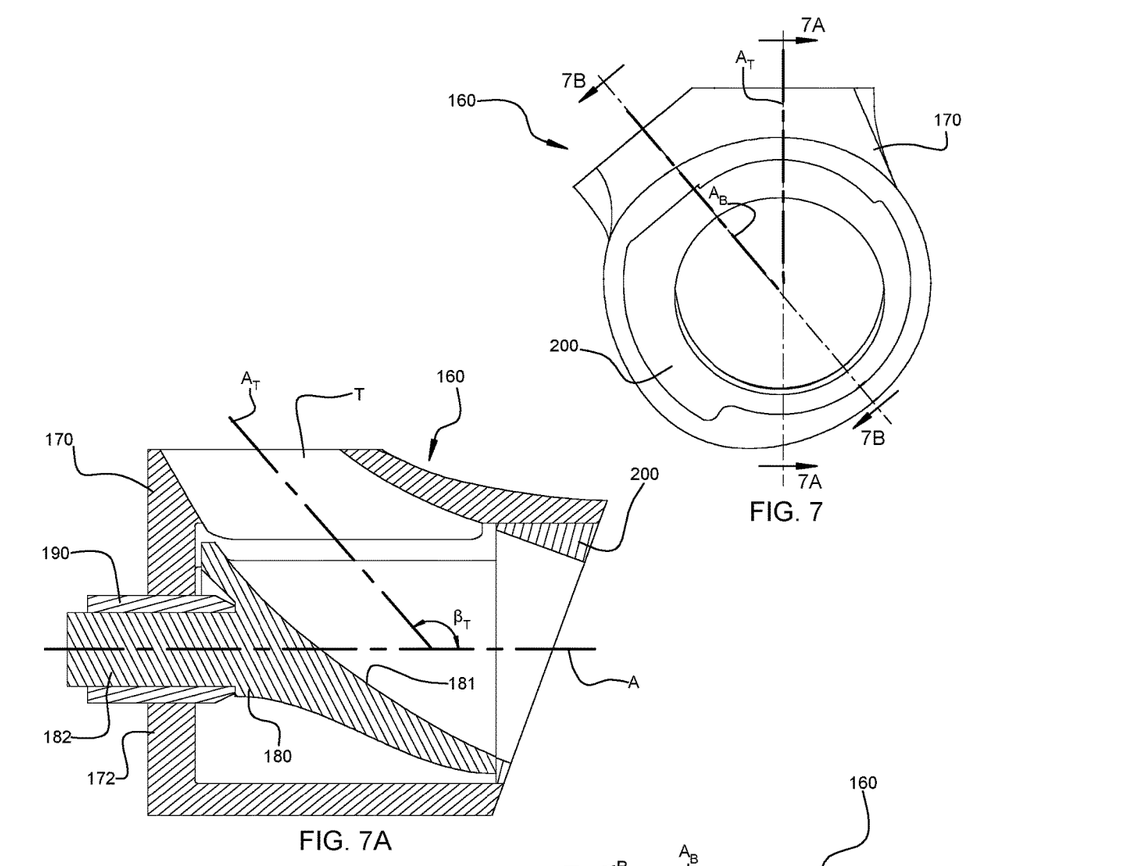
FIG. 7 is an axial end view of the valve of FIG. 5.
FIG. 7A is a cross-sectional view along line 7A-7A in FIG. 7.
Figure 7B:
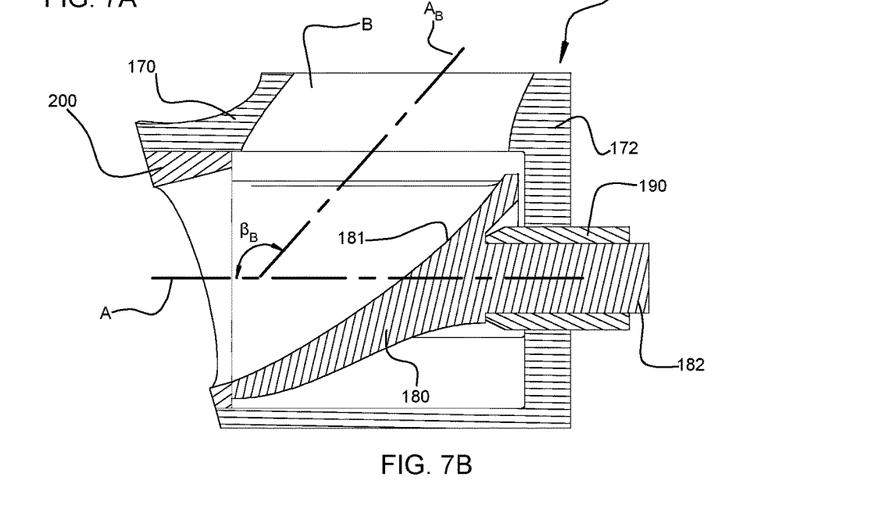
FIG. 7B is a cross-sectional view along line 7B-7B in FIG. 7.

Turning now to FIGS. 6 through 7B, the assembled TBV 160 is depicted. The inlet E to the valve is defined through the open end of the valve housing 170 and the corresponding open end of the valve member 180 and cap 200 disposed in the housing. The valve member rotates about the valve chamber axis A. The valve housing defines the first outlet T and the second outlet B. The first outlet defines a first outlet flow direction $A_T$ that makes an obtuse angle $\beta_T$ with the valve chamber axis A as best seen in FIGS. 7 and 7A. Similarly, the second outlet defines a second outlet flow direction AB that makes an obtuse angle $\beta_B$ with the valve chamber axis A as best seen in FIG. 7B. This structure helps mitigate pressure losses through the valve because the exhaust gas flows are turned through acute angles rather than 90 degrees as would be typical in many rotary valves. An acute angle is defined between the first and second outlet flow directions as shown in FIG. 7. As shown in FIGS. 5A and 6A, the first outlet T has a generally rectangular shape, and the second outlet B is generally trapezoidal or triangular. Shaping and sizing of these outlets will influence the flow characteristics of the valve.

Figure 8:
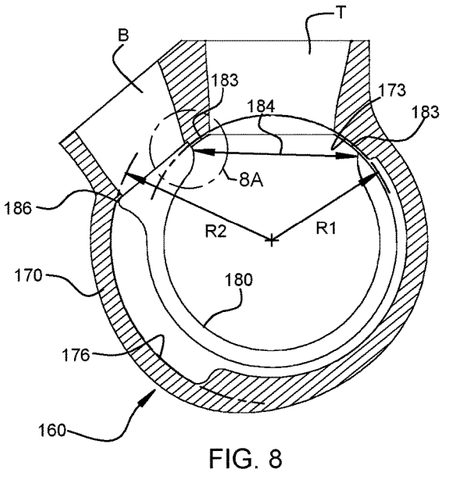
FIG. 8 is a cross-sectional view through the three-way TBV on a plane perpendicular to the valve chamber axis about which the valve member rotates, showing the TBV in a first rotational position.
Figure 8A:
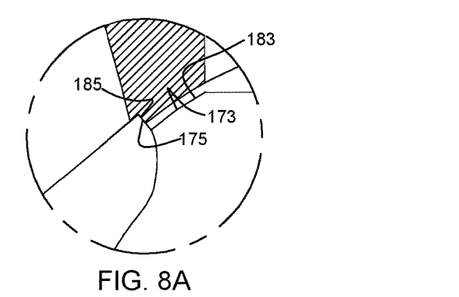
FIG. 8A is a detail view of a portion of FIG. 8.

The function of the TBV 160 is now explained with reference to FIGS. 8 through 11. The inner wall of the valve housing 170 defines a first cylindrical surface 173 of radius R1 relative to the valve chamber axis about which the valve member 180 rotates. Correspondingly the valve member's outer surface includes a first cylindrical surface 183 of radius slightly smaller than R1 so that as small as practicable a clearance exists between these surfaces to allow the valve member to freely rotate while minimizing any leakage therebetween, as shown in FIG. 8. The inner wall of the valve housing further defines a second cylindrical surface 176 of radius R2 from the valve chamber axis, where R2 is greater than R1. Correspondingly the valve member defines a surface 186 (see also FIGS. 4 and 4B) of slightly smaller radius than R2 to minimize leakage. The valve housing inner wall also defines a first valve seat 175 for interacting with the previously described seal surface 185 of the valve member, as best seen in FIGS. 8A and 9A which show the valve member in first and second rotational positions, respectively. The valve housing further defines a second valve seat 177 (FIG. 9) against which the surface 186 of the valve member seats in the first rotational position of the valve member.

Thus, in the first rotational position of the valve member as shown in FIGS. 8 and 8A, the opening 184 in the valve member wall overlaps circumferentially with the entire first outlet T of the valve housing, while a portion of the valve member wall closes the second outlet B. Leakage into the second outlet (i.e., to the turbine bypass) is discouraged by a tortuous leakage pathway defined between the valve member seal surface 185 and the first valve seat 175 (FIG. 8A). Accordingly, the full amount of exhaust gases received through the inlet of the valve is discharged through the first outlet T to the turbine feed passage of the turbine housing.

Figure 9:
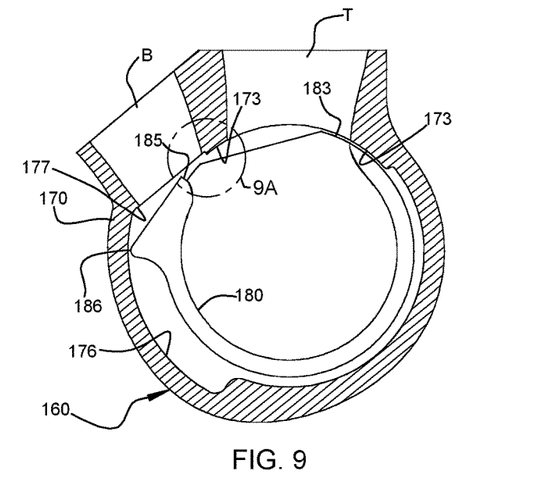
FIG. 9 is similar to FIG. 8, but showing the TBV in a second rotational position.
Figure 9A:
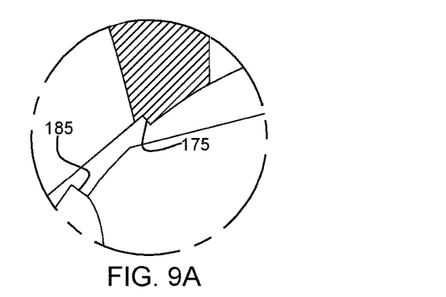
FIG. 9A is a detail view of a portion of FIG. 9.

In the second rotational position of the valve member as shown in FIG. 9, the valve member has begun to open the second outlet B, but the first outlet T remains fully open. This is possible by virtue of the circumferential width of the valve member opening 184 exceeding the sum of the circumferential width of the first outlet T and the circumferential width of the divider portion of the valve housing between the first and second outlets. Thus, a fraction of the exhaust gases will proceed through the second outlet, bypassing the turbine. Regulation of flows to the turbine and bypass can be achieved by adjusting the valve member between the first and second positions.

Figure 10:
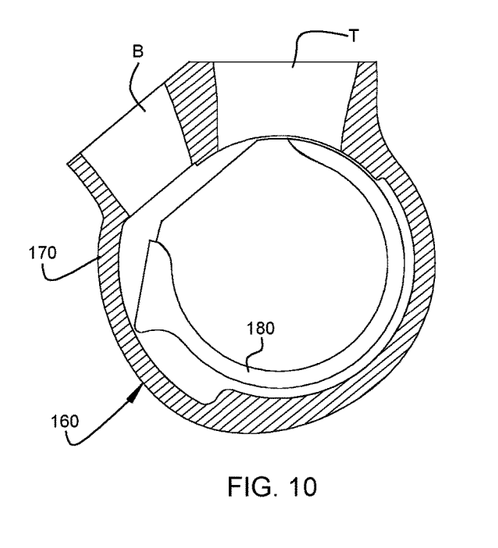
FIG. 10 shows the TBV in a third rotational position.

In the third rotational position of the valve member as shown in FIG. 10, the valve member has partially closed the first outlet T, and the second outlet B is fully open. Accordingly, a relatively large fraction of the exhaust gases will bypass the turbine. Regulation of flows to the turbine and bypass can be achieved by adjusting the valve member between the second and third positions.

Figure 11:
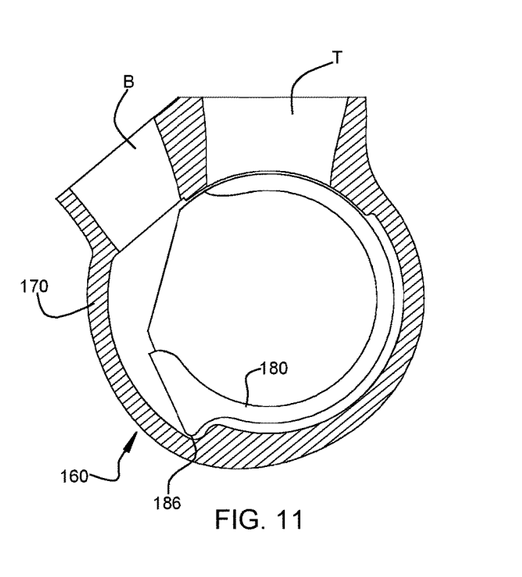
FIG. 11 shows the TBV in a fourth rotational position.

In the fourth rotational position of the valve member as shown in FIG. 11, the first outlet T is now closed, while the second outlet B remains fully open. Thus, the full amount of exhaust gases will bypass the turbine. The fourth position is useful after a cold engine start for rapid heating of the catalyst, since the temperature of the exhaust gases reaching the catalyst will not have been diminished by passage through the turbine wheel. Additionally, the valve in accordance with the invention allows regulation of flow to the turbine to be achieved by adjusting the valve member between the third and fourth positions, while most of the gases will bypass the turbine.

The valve in accordance with the illustrated embodiment of the invention has a number of features that individually and collectively improve upon prior turbine bypass valves. The inventive valve is able to fully shut off exhaust gas flow to the turbine and route all of the exhaust gases directly to the catalytic device for rapid catalyst light-off after a cold engine start, which improves upon conventional waste gates that are not able to completely shut off the turbine flow. The inventive valve also can regulate exhaust gas flow to the turbine during normal engine operation. Pressure losses through the valve can be mitigated by the sloping end wall 181 of the valve member and the configurations of the valve outlets which provide outlet flow directions at obtuse angles to the valve chamber axis. The triangular shape of the second outlet B can optimize the aerodynamic load on the valve.

The first valve seat 175 of the valve housing, interacting with the seal surface 185 on the valve member, can minimize leakage of exhaust gas to the bypass when the valve is in the first position closing the bypass.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A turbocharger, comprising:

a compressor;

a turbine comprising a turbine housing having a turbine wheel disposed therein, the turbine housing defining an annular chamber surrounding the turbine wheel for receiving exhaust gases from an internal combustion engine, and an axial bore through which exhaust gases are discharged after passing through the turbine wheel;

a three-way valve housing comprising an inlet, a first outlet, and a second outlet, the inlet and the first and second outlets being connected to a valve chamber defined by the three-way valve housing, the valve chamber defining a cylindrical inner surface about a valve chamber axis, the first outlet having a first circumferential width and the second outlet having a second circumferential width;

the turbine housing further defining a turbine feed passage connected between the first outlet and the annular chamber, and a bypass passage connected between the second outlet and the axial bore downstream of the turbine wheel;

a rotary valve member disposed in the valve chamber and rotatable about the valve chamber axis between successive first, second, third, and fourth rotational positions, the rotary valve member comprising a hollow member having an outer wall defining a cylindrical outer surface confronting the cylindrical inner surface of the valve chamber, the outer wall defining a valve member outlet comprising an opening through the outer wall, the valve member outlet having a third circumferential width that is large enough to span across all of the first circumferential width of the first outlet plus a portion of the second circumferential width of the second outlet, wherein the first and second outlets and the valve member outlet are configured and positioned such that in the first rotational position of the rotary valve member, the valve member outlet overlaps all of the first outlet while the outer wall closes the second outlet, in the second rotational position the valve member outlet overlaps all of the first outlet and overlaps partially with the second outlet, in the third rotational position the valve member outlet overlaps partially with the first outlet and overlaps all of the second outlet, and in the fourth rotational position the valve member outlet overlaps all of the second outlet while the outer wall closes the first outlet.

2. The turbocharger of claim 1, the first outlet defining a first outlet flow direction that makes an obtuse angle with the valve chamber axis, and the second outlet defining a second outlet flow direction that makes an obtuse angle with the valve chamber axis and makes an acute angle with the first outlet flow direction.

3. The turbocharger of claim 1, wherein the first outlet is rectangular and the second outlet is triangular.

4. The turbocharger of claim 1, wherein one end of the rotary valve member adjacent the inlet to the three-way valve housing is open, and an opposite end of the rotary valve member is closed by an end wall, wherein the end wall makes an obtuse angle with the valve chamber axis.

5. The turbocharger of claim 1, wherein the three-way valve housing is an integrally formed portion of the turbine housing.

6. The turbocharger of claim 1, wherein the three-way valve housing defines a first valve seat adjacent one edge of the second outlet and the valve member defines a first seal surface that engages the first valve seat in the first rotational position of the valve member, the first valve seat and the first seal surface forming a tortuous pathway for leakage into the second outlet.

7. The turbocharger of claim 6, wherein the three-way valve housing defines a second valve seat adjacent an opposite edge of the second outlet and the valve member defines a second seal surface that engages the second valve seat in the first rotational position of the valve member.

* * * * *